US007048889B2

(12) United States Patent
Arney et al.

(10) Patent No.: US 7,048,889 B2
(45) Date of Patent: May 23, 2006

(54) DYNAMICALLY CONTROLLABLE BIOLOGICAL/CHEMICAL DETECTORS HAVING NANOSTRUCTURED SURFACES

(75) Inventors: Susanne Arney, Highland Park, NJ (US); Timofei Nikita Kroupenkine, Warren, NJ (US); Alan Michael Lyons, New Providence, NJ (US); Mary Louise Mandich, Martinsville, NJ (US); Michael J Schabel, Clark, NJ (US); Joseph Ashley Taylor, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/806,543

(22) Filed: Mar. 23, 2004

(65) Prior Publication Data

US 2006/0040375 A1 Feb. 23, 2006

(51) Int. Cl.
*G01N 15/06* (2006.01)

(52) U.S. Cl. ........................ 422/68.1; 422/50; 422/55; 435/4; 435/7.1; 436/501

(58) Field of Classification Search ................. 422/50, 422/55, 57, 68.1, 82.05; 435/4, 7.1, 283.1, 435/286.1, 286.5, 287.1, 288.7; 436/501, 436/518, 435, 149, 164; 429/12, 42, 43
See application file for complete search history.

(56) References Cited

U.S. PATENT DOCUMENTS 5,674,592 A * 10/1997 Clark et al. ................. 428/161
5,929,208 A * 7/1999 Heller et al. ................ 530/333
6,042,959 A * 3/2000 Debe et al. ................... 429/33
6,066,448 A * 5/2000 Wohlstadter et al. .......... 435/6
6,123,819 A * 9/2000 Peeters ....................... 204/452
6,185,961 B1 2/2001 Tonucci et al. .............. 65/60.4
6,287,765 B1 * 9/2001 Cubicciotti .................... 435/6
6,685,841 B1 * 2/2004 Lopez et al. ................ 210/767
6,845,788 B1 * 1/2005 Extrand ....................... 138/39
6,911,276 B1 * 6/2005 Extrand ....................... 429/32

(Continued)

FOREIGN PATENT DOCUMENTS

EP 1 473 079 A1 11/2004

(Continued)

OTHER PUBLICATIONS

Kim, et al., "*Nanostructured Surfaces for Dramatic Reduction of Flow Resistance in Droplet-Based Microfluidics*," IEEE, pp. 479-482 (2002).

(Continued)

*Primary Examiner*—Long V. Le
*Assistant Examiner*—Melanie J. Yu

(57) ABSTRACT

A biological/chemical detector is disclosed that is capable of manipulating liquids, such as reagent droplets, without relying on microchannels. In a first embodiment, fluid flow is passed through the detector, thus causing particles wholly or partially containing an illustrative chemical compound or biological species to be collected on the tips of nanostructures in the detector. A droplet of liquid is moved across the tips of the nanostructures, thus absorbing the particles into the liquid. The droplet is caused to penetrate the nanostructures in a desired location, thus causing the chemical compound or biological species in said liquid droplet to come into contact with, for example, a reagent. In another embodiment, a fluid flow is passed through the nanostructured surfaces of the detector such that the chemical compound and/or biological species are deposited between the nanoposts of a desired pixel. A droplet of liquid is moved across the surface to that desired pixel and is caused to penetrate the nanostructures of the pixel, thus contacting a reagent.

20 Claims, 18 Drawing Sheets

U.S. PATENT DOCUMENTS

| | | | | |
|---|---|---|---|---|
| 2002/0125192 | A1* | 9/2002 | Lopez et al. | 210/656 |
| 2003/0134267 | A1* | 7/2003 | Kang et al. | 435/4 |
| 2003/0148401 | A1 | 8/2003 | Agrawal et al. | 435/7.9 |
| 2005/0118494 | A1* | 6/2005 | Choi | 429/43 |

FOREIGN PATENT DOCUMENTS

| | | | |
|---|---|---|---|
| WO | WO 02/057014 | A1 | 7/2002 |
| WO | WO 03/051517 | A2 | 6/2003 |
| WO | WO 03/103835 | A1 | 12/2003 |

OTHER PUBLICATIONS

Washizu, "Electrostatic Actuation of Liquid Droplets for Microreactor Applications", *IEEE Transactions on Industry Applications*, vol. 34, No. 4, pp. 732-737 (Jul./Aug. 1998).

* cited by examiner

DYNAMICALLY CONTROLLABLE BIOLOGICAL/CHEMICAL DETECTORS HAVING NANOSTRUCTURED SURFACES

FIELD OF THE INVENTION

The present invention relates generally to biological/chemical detectors and, more particularly, to dynamically controllable integrated biological/chemical detectors having nanostructured surfaces.

BACKGROUND OF THE INVENTION

Biological and chemical detector technology has become ever more important over the last several years and, as a result, has been undergoing dramatic growth. This growth is primarily fueled by the need for fast, highly sensitive and highly specific detector systems that would reduce false alarm rates and increase the ability to detect and identify chemical and biological species, such as chemical and biological warfare agents, in a wide range of environments. Currently, the majority of commercially-available chemical and biological agent detection systems rely on separate components or devices for sample collection, separation, and analysis. Thus, operation of such systems often requires multiple manual steps to accomplish, for example, sample preparation and loading, tag and assay handling, fluids recharging, results characterization, etc. None of the commercially available traditional chemical/biological detection systems provides a truly portable integrated unit capable of fully automated detection of multiple chemical or biological agents in a wide range of environments.

In an attempt to better integrate the separate components of chemical and biological detection systems, and to reduce the size of such systems, more recent efforts have focused on microfluidics-based detection systems. These more recent systems are advantageous in that they are useful in a wide range of detection applications and are conceptually similar to well-understood traditional lab analysis techniques. One such effort, known as the LabChip® system produced by Caliper Technologies, uses chips having small channels, e.g., from 5 micrometers to 50 micrometers, to control the flow of samples across a surface for analysis. The chips in the Caliper Technologies system are inserted into the LabChip® system, which includes multiple components for containing reagents and software for controlling experiments and displaying results. The LabChip® system reduces the number of manual steps, thus reducing human error, and requires very small levels of reagent to operate. Once a researcher introduced the samples to the chip, e.g., via pipette, the samples were routed via the microchannels to sampling locations on the chip and analyzed by other components in the system.

Another recent attempt, known as the LILLIPUT chip which is used, for example, with microparts Corporation microspectrometer, uses microchannels linked to a large number of sampling wells in a very small package. Once again, after pipette samples are introduced onto the chip, the samples are routed to the appropriate sampling well via microchannel. As in the LabChip® system, other components are used to analyze the samples and display the results of the analysis.

In yet another attempt, known as the NanoChip™ system by Nanogen Corporation, samples are electrically directed along the surface of a chip to one of a number of test sites. Specifically, since most samples have a natural electrical charge, the samples in the NanoChip™ system can be attracted to a particular test site by creating an opposite charge at that test site. Thus, for example, once a negatively-charged sample is introduced into the NanoChip™ system, e.g., via pipette, that sample can be directed to one or more positively charged test sites.

SUMMARY OF THE INVENTION

The present inventors have realized that, while prior chemical and biological detection systems are advantageous in many applications, they are limited in certain respects. Specifically, as discussed previously, traditional systems often required multiple manual steps to accomplish the tasks of sample collection, separation and analysis. While microfluidics applications, such as the aforementioned LabChip®, LILLIPUT chip and the NanoChip™ systems, significantly reduce the number of manual steps, they are limited in that a researcher must input samples manually, typically via pipette. Such systems are also limited in that they require microchannels to transport liquids to test sites and, thus, are relatively inflexible in the destination to which the liquid is transported. Additionally, while such microfluidics-based systems achieve a certain amount of integration over such traditional systems, such microfluidics-based systems still typically lack full integration of components. Therefore, for example, such systems require separate components to analyze the samples and characterize the results of the analysis. Also, such microfluidics systems are typically characterized by relatively low sample throughput, relatively low component integration density, poor reliability, and often require substantial power to generate effective liquid flow actuation.

Therefore, the present inventors have invented an integrated, dynamically controllable biological/chemical detector that is capable of manipulating liquids, such as reagent droplets, across nanostructured surfaces without relying on microchannels. Specifically, the detector of the present invention has at least a first nanostructured surface, at least a first droplet of liquid, at least a first reagent pixel, and means for moving said at least a first droplet of liquid across said at least a first nanostructured surface in a way such that it contacts said at least a first reagent pixel.

In a first embodiment, a fluid flow is passed through the nanostructured surfaces of the detector, thus causing particles of, illustratively, a chemical compound or biological species carried by the fluid flow to be collected on the tips of a portion of the nanostructures on the nanostructured surfaces. A droplet of liquid is moved across the tips of the nanostructures, thus absorbing the particles into the liquid. The droplet transporting the particles is then further moved to a desired reagent pixel in an illustrative array of pixels. The desired reagent pixel has, for example, a first reagent disposed between the nanostructures of that pixel in a way such that, when a liquid passes across the nanostructures, it does not come into contact with the reagent in the pixel. Once the droplet of liquid reaches the desired pixel, the droplet is caused to penetrate the nanostructures in the pixel, thus causing the particles in said liquid droplet to come into contact with the reagent. If the particles wholly or partially consist of a particular substance or biological species such as spores, viruses or bacteria corresponding to the reagent, a chemical reaction will result, thus producing an indication of the presence of the particular substance or species.

In another embodiment, fluid flow is passed through the nanostructured surfaces of the detector in a way such that particles are deposited between the nanoposts of a desired pixel. A droplet of liquid is moved across the surface to that desired pixel and is caused to penetrate the nanostructures of the pixel, thus inducing a reaction between the liquid and/or reagent and the particles. Once again, if the particles wholly or partially consist of a particular substance or biological species corresponding to the reagent, a chemical reaction will result, thus producing an indication of the presence of the substance or species.

Movement of droplets of liquids across the nanostructured surfaces is achieved, in another embodiment, by varying the aerial density of the nanostructures on the nanostructured surface, thus causing a droplet to move to that area having the highest density of nanostructures. In yet another embodiment, this movement is achieved by sequentially applying a voltage to a plurality of electrodes, thus causing said droplet to move in a desired direction. In another illustrative embodiment, the droplets are caused to penetrate the nanostructures in a desired pixel by applying a voltage to the nanostructures in the desired pixel. Alternatively, the droplet can be caused to penetrate the nanostructures by increasing the temperature of the droplet, thus causing the surface tension of the droplet to decrease. Finally, the droplet can be caused to penetrate the nanostructures by passing an acoustic or electromagnetic spectrum signal through the detector.

DETAILED DESCRIPTION

In the microfluidic chemical and biological detectors described above, reagent liquids are typically disposed in microchannels that are, illustratively, superhydrophobic, i.e., the surface of the microchannel is resistant to penetration by the liquids. FIGS. 1A–1E show different illustrative superhydrophobic surfaces produced using various methods. Specifically, these figures show surfaces having small posts, known as nanoposts and/or microposts with various diameters and with different degrees of regularity. An illustrative method of producing nanoposts and microposts, found in U.S. Pat. No. 6,185,961, titled "Nanopost arrays and process for making same," issued Feb. 13, 2001 to Tonucci, et al, is hereby incorporated by reference herein in its entirety. Nanoposts have been manufactured by various methods, such as by using a template to form the posts, by various means of lithography, and by various methods of etching.

Figure 1A:
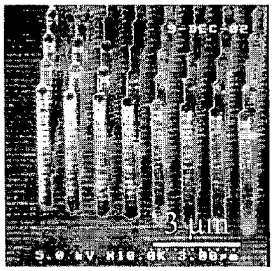
FIGS. 1A, 1B, 1C, 1D and 1E show various prior art nanostructure feature patterns of predefined nanostructures that are suitable for use in the present invention.
Figure 1B:
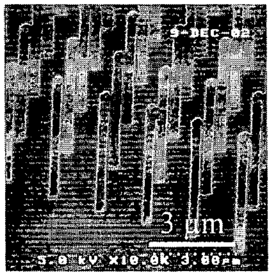
Figure 1C:
Figure 1D:
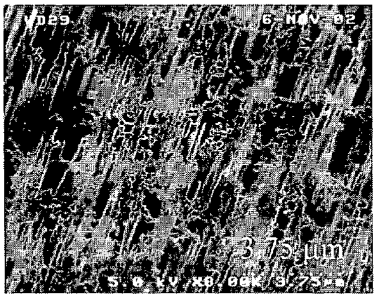
Figure 1E:
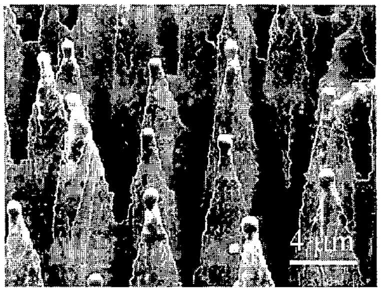
Figure 2:
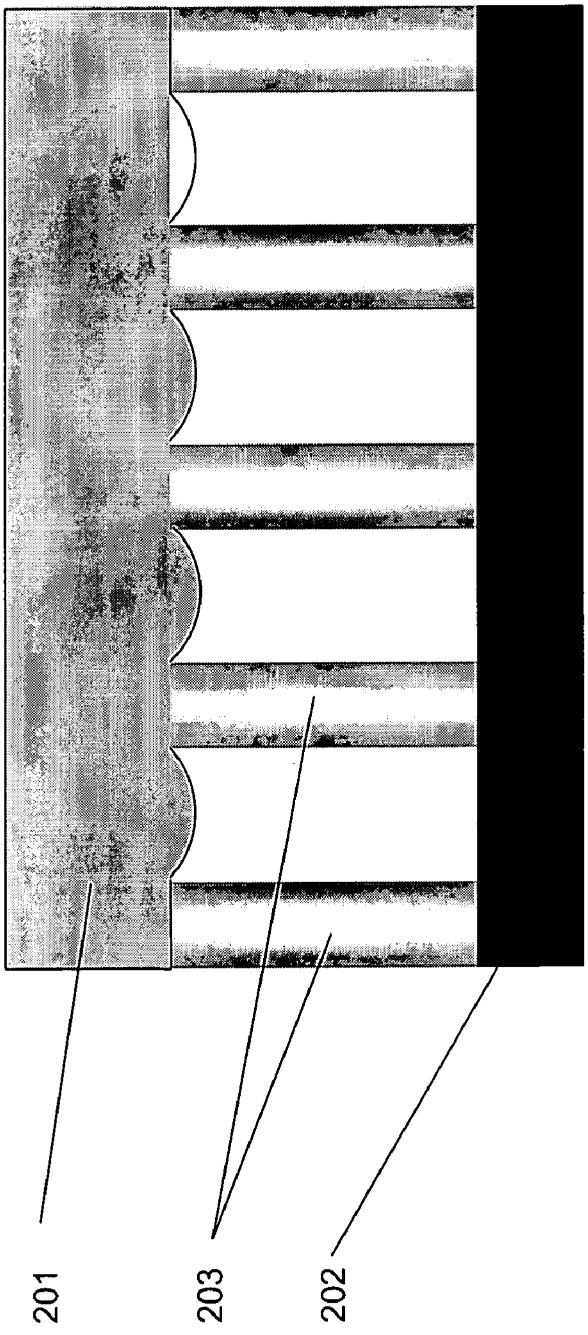
FIG. 2 shows an illustrative prior art device wherein a liquid droplet is disposed on a nanostructured feature pattern

When a droplet of liquid, such as water, is placed on a surface having an appropriately designed nanostructured or microstructured feature pattern, the flow resistance experienced by the droplet is dramatically reduced as compared to a droplet on a surface having no such nanostructures or microstructures. Surfaces having such appropriately designed feature patterns are the subject of the article titled "Nanostructured Surfaces for Dramatic Reduction of Flow Resistance in Droplet-based Microfluidics", J. Kim and C. J. Kim, IEEE Conf. MEMS, Las Vegas, Nev., January 2002, pp. 479–482, which is hereby incorporated by reference herein in its entirety. That reference generally describes how, by using surfaces with predetermined nanostructure features, the flow resistance to the liquid in contact with the surface can be greatly reduced. Specifically, the Kim reference teaches that, by finely patterning the surface in contact with the liquid, and using the aforementioned principle of liquid surface tension, a droplet of liquid disposed on the surface will be supported on the tops of the nanostructure pattern, as shown in FIG. 2. Referring to FIG. 2, droplet 201 of an appropriate liquid (depending upon the surface structure) will enable the droplet 201 to be suspended on the tops of the nanoposts 203 with no contact between the droplet and the underlying solid surface. This results in an extremely low area of contact between the droplet and the surface 202 (i.e., the droplet only is in contact with the top of each post 203) and, hence a low flow resistance.

Figures 3A, 3B, 3C, 3D, 3E, 3F:
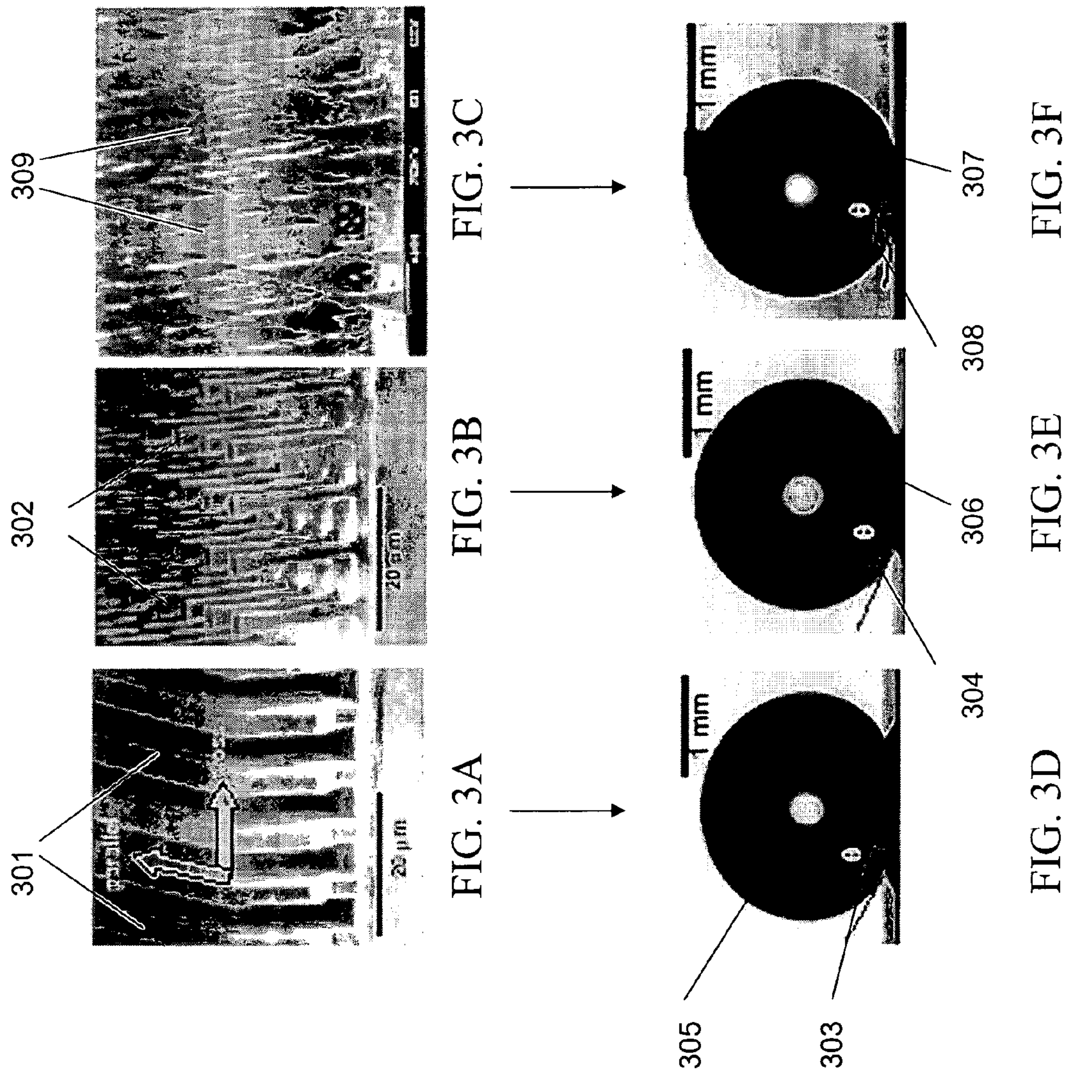
FIG. 3A shows a prior art microline surface.
FIG. 3B shows a prior art micropost surface.
FIG. 3C shows a prior art nanopost surface.
FIG. 3D shows a droplet of liquid disposed on the prior art surface of FIG. 3A and the corresponding contact angle that results between the droplet and that surface.
FIG. 3E shows a droplet of liquid disposed on the prior art surface of FIG. 3B and the corresponding contact angle that results between the droplet and that surface.
FIG. 3F shows a droplet of liquid disposed on the prior art surface of FIG. 3C and the corresponding contact angle that results between the droplet and that surface.

FIGS. 3A–3F show how different, extremely fine-featured microstructure and nanostructure surface patterns result in different contact angles between the resulting surface and a droplet of liquid. FIGS. 3A and 3B show a microline surface and a micropost surface, respectively. Each of the lines 301 in FIG. 3A is approximately 3–5 micrometers in width and each of the microposts 302 in FIG. 3B is approximately 3–5 micrometers in diameter at its widest point. Comparing the microline pattern to the micropost pattern, for a given size droplet disposed on each of the surfaces, the contact area of the droplet with the microline pattern will be greater than the contact area of the droplet with the micropost pattern. FIGS. 3D and 3E show the contact angle of a droplet relative to the microline surface of FIG. 3A and the micropost surface of FIG. 3B, respectively. The contact angle 303 of the droplet 305 on the microline pattern is smaller (~150 degrees) than the contact angle 304 of the droplet 306 with the micropost pattern (~160 degrees). As described above, it directly follows that the flow resistance exerted on the droplet by the microline pattern will be higher than that exerted by the micropost pattern.

FIG. 3C shows an even finer pattern than that of the microline and micropost pattern. Specifically, FIG. 3C shows a nanopost pattern with each nanopost 309 having a diameter of less than 1 micrometer. While FIG. 3C shows nanoposts 309 formed in a somewhat conical shape, other shapes and sizes are also achievable. In fact, cylindrical nanopost arrays have been produced with each nanopost having a diameter of less than 10 nm. Specifically, Referring to FIG. 3F, a droplet 307 disposed on the nanopost surface of FIG. 3C, is nearly spherical with a contact angle 308 between the surface and the droplet equal to between 175 degrees and 180 degrees. The droplet 307 disposed on this surface experiences nearly zero flow resistance.

Figure 4A:
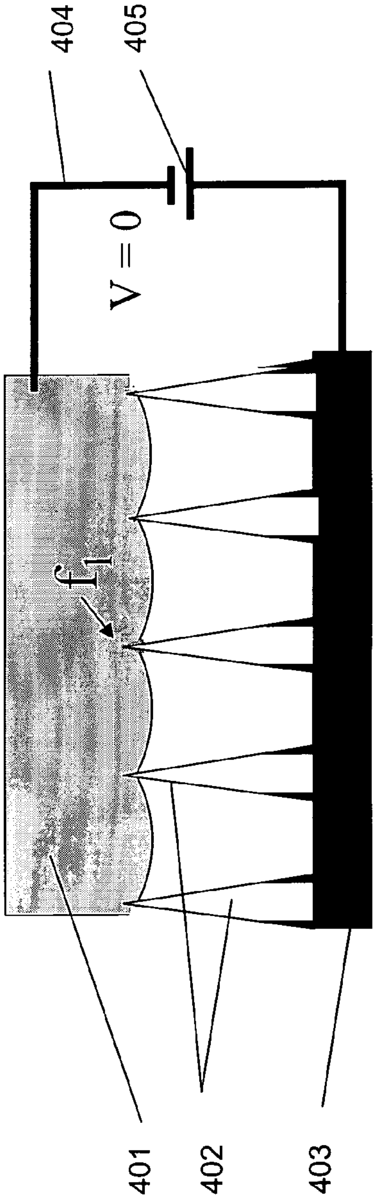
FIGS. 4A and 4B show a device in accordance with the principles of the present invention whereby electrowetting principles are used to cause a liquid droplet to penetrate a nanostructure feature pattern.
Figure 4B:
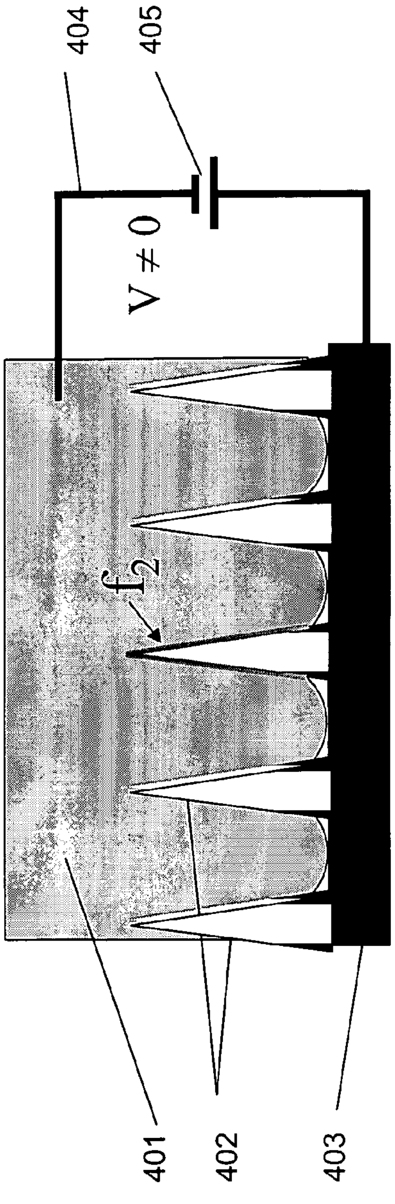
Figure 5:
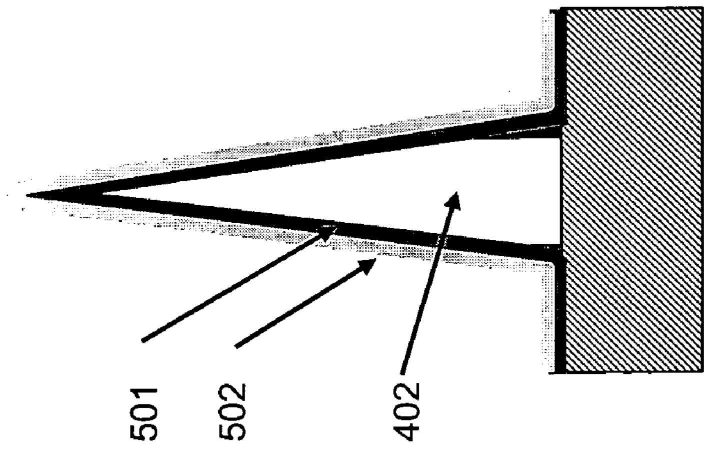
FIG. 5 shows the detail of an illustrative nanopost of the nanostructure feature pattern of FIGS. 4A and 4B.

In many applications, it is desirable to be able to control the penetration of a given liquid, such as the droplets of FIGS. 3D–3F, into a given nanostructured or microstructured surface and, thus, control the flow resistance exerted on that liquid as well as the wetting properties of the solid surface. FIGS. 4A and 4B show one embodiment in accordance with the principles of the present invention where electrowetting is used to control the penetration of a liquid into a nanostructured surface. Such electrowetting is the subject of copending U.S. patent application Ser. No. 10/403,159, filed Mar. 31, 2003, and titled "Method and Apparatus for Controlling the Movement of a Liquid on a Nanostructured or Microstructured Surface," which is hereby incorporated by reference herein in its entirety. Referring to FIG. 4A, a droplet 401 of conducting liquid is disposed on a nanostructure feature pattern of conical nanoposts 402, as described above, such that the surface tension of the droplet 401 results in the droplet being suspended on the upper portion of the nanoposts 402. In this arrangement, the droplet only covers surface area $f_1$ of each nanopost. The nanoposts 402 are supported by the surface of a conducting substrate 403. Droplet 401 is illustratively electrically connected to substrate 403 via lead 404 having voltage source 405. An illustrative nanopost is shown in greater detail in FIG. 5. In that figure, nanopost 402 is electrically insulated from the liquid (401 in FIG. 9A) by material 501, such as an insulating layer of dielectric material. The nanopost is further separated from the liquid by a low surface energy material 502, such as a well-known fluoropolymer. Such a low surface energy material allows one to obtain an appropriate initial contact angle between the liquid and the surface of the nanopost. It will be obvious to one skilled in the art that, instead of using two separate layers of different material, a single layer of material that possesses sufficiently low surface energy and sufficiently high insulating properties could be used.

FIG. 4B shows that by, for example, applying a low voltage (e.g., 10–20 volts) to the conducting droplet of liquid 401, a voltage difference results between the liquid 401 and the nanoposts 402. The contact angle between the liquid and the surface of the nanopost decreases and, at a sufficiently low contact angle, the droplet 401 moves down in the y-direction along the surface of the nanoposts 402 and penetrates the nanostructure feature pattern until it complete surrounds each of the nanoposts 402 and comes into contact with the upper surface of substrate 403. In this configuration, the droplet covers surface area $f_2$ of each nanopost. Since $f_2 >> f_1$, the overall contact area between the droplet 401 and the nanoposts 402 is relatively high and, accordingly, the flow resistance experienced by the droplet 401 is greater than in the embodiment of FIG. 4A. Thus, as shown in FIG. 4B, the droplet 401 effectively becomes stationary relative to the nanostructure feature pattern in the absence of another force sufficient to dislodge the droplet 401 from the feature pattern. Other methods of causing the above-described penetration of the nanostructured feature pattern may also be used, such as, for example, increasing the temperature of the droplet or the nanostructures, altering the chemical composition of the droplet, or using acoustic or radio frequency waves to reduce the surface tension of the droplet. One skilled in the art will be able to devise alternate methods of causing penetration of the droplet into the nanostructured feature pattern in light of the teachings herein.

Figure 6A:
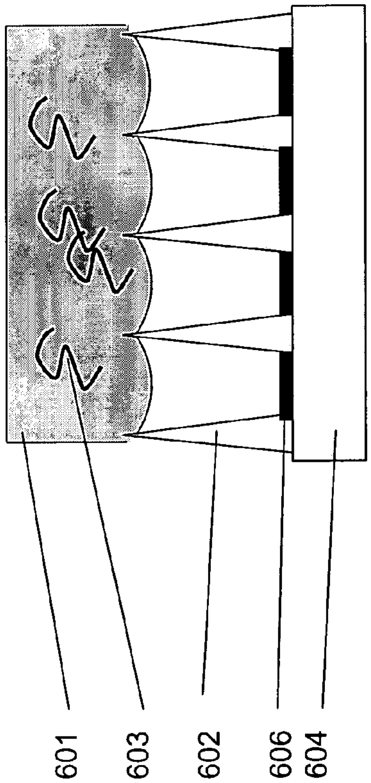
FIGS. 6A and 6B show a chemical or biological detector using the electrowetting principles shown in FIGS. 4A and 4B.
Figure 6B:
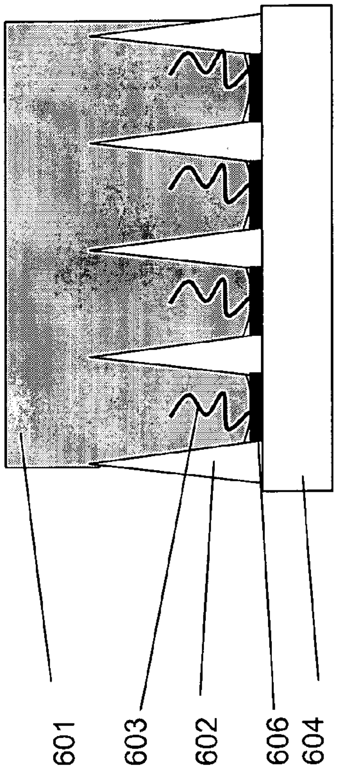

FIGS. 6A and 6B show an embodiment of a biological or chemical detector, as described in the aforementioned copending '159 application, that uses the nanostructured feature pattern represented in FIG. 4. Referring to FIG. 6A, droplet 601 is disposed on nanostructures 602 similar to that shown in FIG. 4A. Detectors 606, which are able to detect the desired biological or chemical compound 603, are illustratively disposed on surface 604. The liquid for droplet 601 and the nanostructures 602 are chosen such that, for example, when the desired compound 603 enters the liquid in a desired amount, the surface tension of the liquid drops and, as shown in FIG. 6B, the liquid 601 penetrates the nanostructure pattern and comes into contact with the detectors 606. Alternatively, droplet could be caused to penetrate the nanostructures using the above-discussed electrowetting method. When the compound 603 comes into contact with the detectors 606, an indication of such contact can be generate by well-known methods, such as via the generating of an electrical signal or the changing of the color of the detector.

In addition to being used as a detector, and as also described in the '159 application, the embodiment of FIGS. 6A and 6B may also be used as a method of achieving a desired chemical reaction. For example, once again referring to FIG. 6A, it is possible to select a liquid for droplet 601 such that the liquid already contains a compound 603, such as a chemical compound or a biological agent, such as antigens, antibodies, DNA, RNA or other various biologically active species such as RNA polymerase DNA transcriptase, etc. Detectors 606 in this embodiment are fashioned out of a desired reactant compound that will achieve a desired reaction when in contact with element or compound 603. These detectors/reactants 606 are disposed between the nanostructures such that, when the liquid droplet penetrates the nanostructure feature pattern as shown in FIG. 6B, the two or more chemicals or species come into contact with each other and the desired reaction occurs. As previously described (e.g., in the discussion associated with FIGS. 4A and 4B, above), the droplet can be made to penetrate the feature pattern by either applying a voltage to the droplet or, alternatively, by using some method for lowering the surface tension of the liquid droplet 601 (and, thus, the contact angle it forms with the surfaces of the nanostructures) such as, for example, increasing the temperature of the liquid droplet 601.

Figure 7:
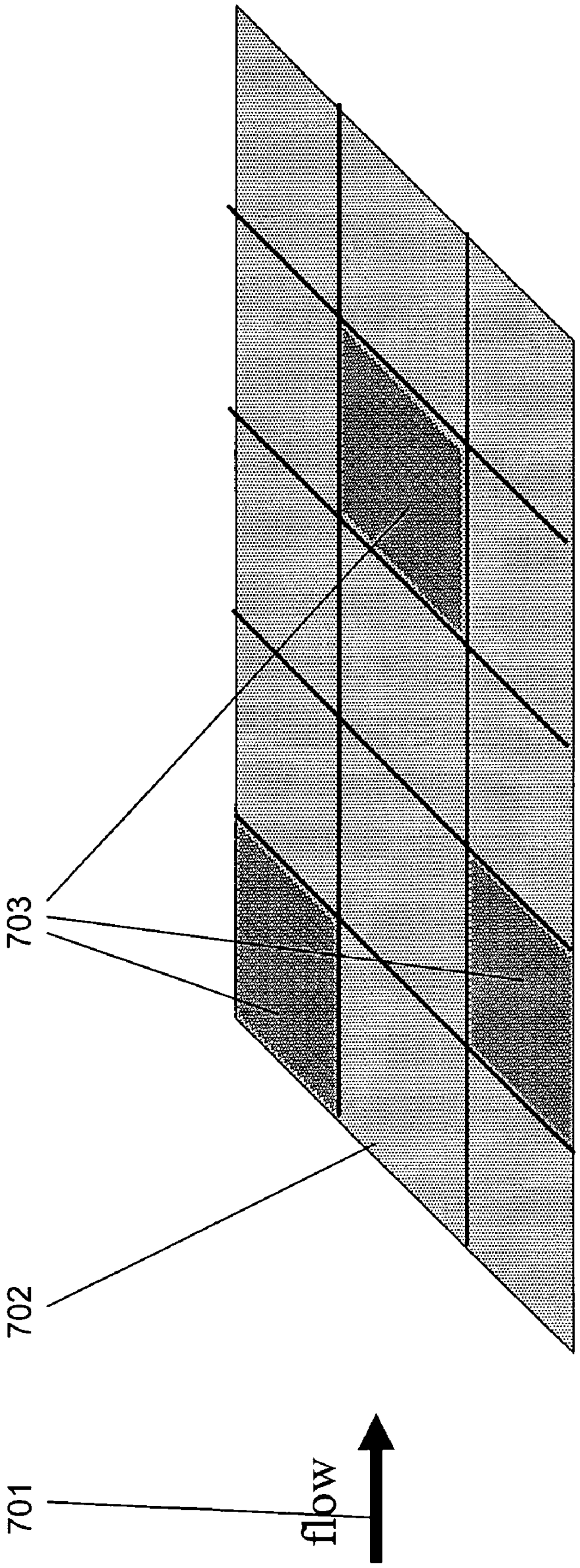
FIG. 7 shows how the detector of FIGS. 6A and 6B can be arranged in an array in able to detect multiple elements or compounds.

FIG. 7 shows a possible arrangement of the illustrative embodiments of FIGS. 6A and 6B, whether used as a chemical/biological detector or used in a chemical reaction application. Specifically, as discussed below, a liquid can be made to flow in direction 701 across the surface of array 702, which has a predetermined arrangement of nanostructures patterned on its surface. Each of areas 703 may, for example, have detectors/reactants (such as 606 in FIGS. 6A and 6B) disposed between the nanostructures that are suited, for example, for detecting or reacting with one or more chemical/biological compounds or agents. Thus, if used as a detector, the array 702 of FIG. 7 could be used to detect multiple different compounds. If used as a chemical reactor, each of the areas could be designed so as to react with only a certain compound to achieve the desired reactions.

Figure 8:
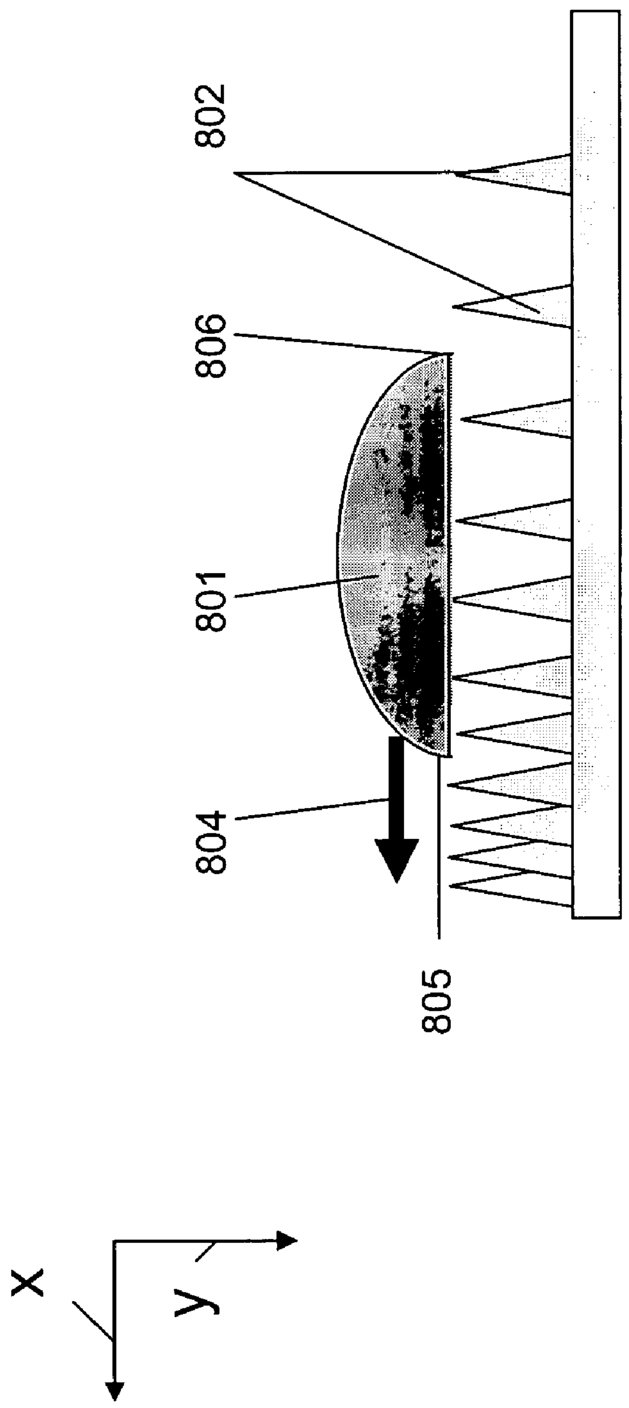
FIG. 8 shows how it is possible to move a droplet of liquid across a surface having a variable areal gradient of nanostructures.

Instead of placing the detector of FIG. 7 in a flow of liquid, it may be desirable to cause a liquid droplet to move across the surface in a predetermined direction independent of a broader liquid flow. FIG. 8 shows a device to accomplish such predetermined movement whereby the nanostructures (nanoposts 802 in this illustrative embodiment) are arranged such that the droplet 801 moves laterally in the x-direction 804. Specifically, the nanoposts 802 are arranged so that the density of nanoposts 802 increases in the x-direction 804. This increased density will lead to a lower contact angle at the leading edge 805 of the droplet relative to the contact angle at the trailing edge 806 of the droplet. The lower contact angle at edge 805 leads to a lower force in the x-direction applied to the droplet 801 than does the relatively higher contact angle at edge 806. Thus, this imbalance of forces will cause the droplet 801 to "drift" in the x-direction 804 toward the area of higher density of nanoposts 802 as the liquid droplet 801 attempts to achieve equilibrium. Thus, by placing the highest density of nanoposts at that location at which it is desired to have the liquid disposed on the surface, a liquid droplet can be initially disposed at another location on the surface and it will autonomously move toward that area of highest density of nanoposts. This and other methods of causing a droplet to move laterally across a nanostructured surface are described in the copending '159 application.

Figure 9:
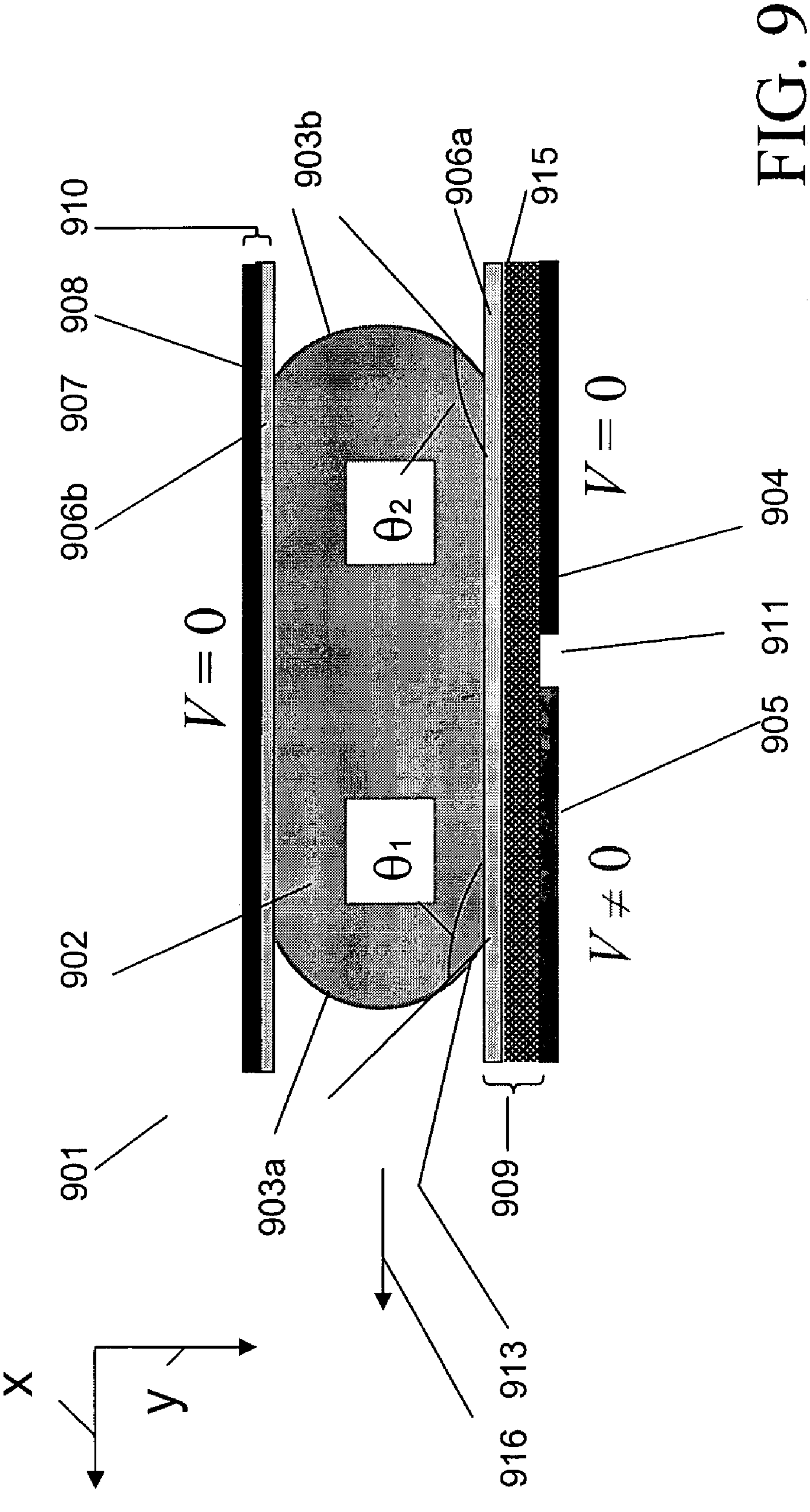
FIG. 9 shows how it is possible to move a droplet disposed between two parallel surfaces by varying the contact angles of the droplet with those surfaces.

FIG. 9 shows a prior art embodiment of a structure 901 that relies on the electrowetting principles as opposed to different densities of nanostructures, as described above, to move a droplet of conductive fluid 902 across substrate 909 that is, for example, one of two rigid hydrophobic substrates 909 and 910 disposed parallel to each other. The second rigid substrate 910 on top of droplet 902 constrains the movement of the droplet in the y-direction. Layers 906*a* and 906*b* which are illustrative insulating surfaces, are disposed on a first surface of substrate 909 and first surface of substrate layer 910, respectively. Dielectric layer 915 serves to separate two electrodes, 904 and 905 respectively, from the layer 906*a* and droplet 902. The dielectric layer is, for example, a 6 μm thick layer of polyimide. Electrodes 904 and 905 are separated from each other by a dielectric spacer 911 such as, e.g., a spacer made from Teflon® material manufactured by Dupont or, alternatively, simply a gap between the electrodes. A third unpatterned ground electrode 908 is disposed on substrate 910 in a way such that it is not in contact with either electrodes 904 or 905. The inner surfaces 906*a* and 906*b* are, for example, hydrophobic surfaces, such as surfaces manufactured from a well-known fluoropolymer.

Electrowetting principles, such as those discussed above, are used to reversibly change the contact angle θ between the liquid and the inner surface 906*a*. The contact angle θ between the droplet and the inner surface 906*a* can be determined by interfacial surface tensions and can be calculated by the equation $$\cos\theta = \frac{\gamma_{S-V} - \gamma_{S-L}}{\gamma_{L-V}} \qquad \text{Equation 1}$$

where $\gamma_{S-v}$ is the interfacial tension between the inner surface 906*a* and the air, gas or other liquid that surrounds the droplet 902, $\gamma_{L-v}$ is the interfacial tension between the droplet 902 and the air, gas or other liquid that surrounds the droplet 902, and $\gamma_{S-L}$ is the interfacial tension between the inner surface 906*a* and the droplet 902.

When no voltage difference is present between the droplet 902 and the electrode 905, the droplet 902 maintains its position between the two substrates 909 and 910 with contact angle $\theta_1=\theta_2$ where $\theta_1$ is determined by the interfacial tensions γ as explained above. When a voltage V is applied to the electrode 905, the voltage difference between the electrode 905 and the droplet 902 causes the droplet to attempt to spread. Specifically, the contact angle where boundary 913 meets surface 909 decreases when the voltage is applied between the electrode 905 and the droplet 902. The voltage V necessary to achieve this change may range from several volts to several hundred volts. The amount of movement, i.e., as determined by the difference between $\theta_1$ and $\theta_2$, is a function of the applied voltage V. The contact angle under an applied voltage can be determined by the equation $$\cos\theta(V) = \cos\theta(V=0) + \frac{\varepsilon_o \varepsilon_r}{2d\gamma_{L-V}} V^2 \qquad \text{Equation 2}$$

where $\theta_1$ is the contact angle between the surface 906*a* and the droplet 902 when no voltage is applied between the droplet 902 and electrode 905; $\gamma_{L-V}$ is the droplet interfacial tension; $e_r$ is the dielectric constant of the layer 906*a*; and $e_0$ is $8.85\times10^{-12}$ F/M—the permittivity of a vacuum. Since the droplet of FIG. 9 is constrained in its movement in the y-direction, a difference in contact angle caused by the applied voltage V leads to a force imbalance between the opposite sides 903*a* and 903*b* of the fluid droplet. As a result, the fluid droplet moves in direction 916.

Figure 10:
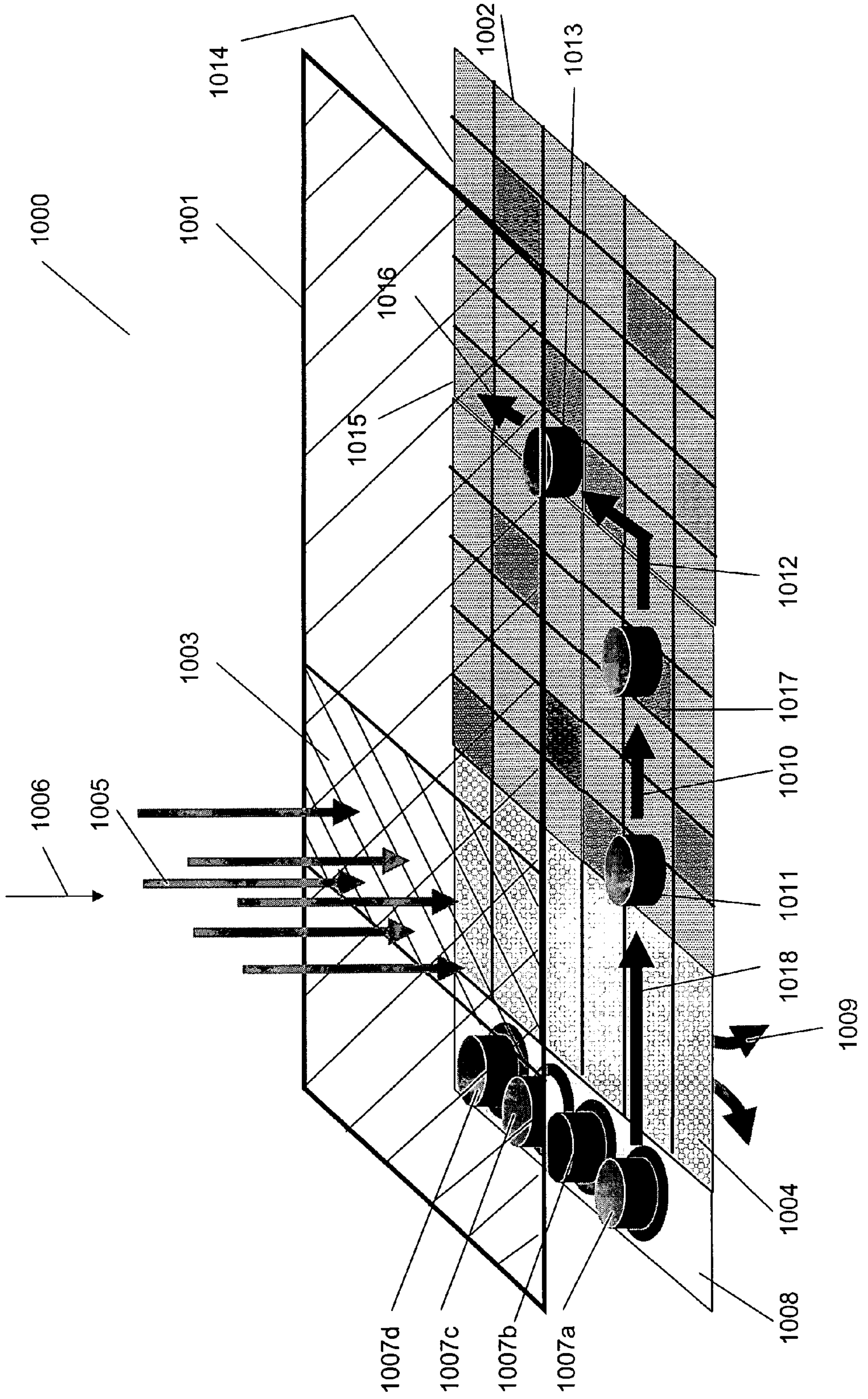
FIG. 10 shows one embodiment of a biological/chemical detector in accordance with the principles of the present invention.

FIG. 10 shows an integrated biological/chemical detector in accordance with the principles of the present invention whereby, for example, airborne chemical and/or biological particles are collected and transported to specific pixels in a detector array. The particles are then caused to come into contact with one or more detector reagents in those pixels, thus inducing a chemical reaction. These chemical reactions may cause, for example, the reflectivity of a particular pixel to change or an electrical signal to be generated, thus providing a readily discernible indication for determining whether an airborne particle was detected. One skilled in the art will appreciate in light of the teachings herein below that, while the embodiments herein describe particles in an airflow, those embodiments are equally advantageously used with any fluid flow carrying particles, such as a flow of a liquid.

Referring to FIG. 10, detector 1000 is shown having two substantially parallel containment surfaces 1001 and 1002. These containment surfaces are, illustratively, the inner surfaces of a portable biological/chemical detector, however, any arrangement whereby two surfaces are disposed in a substantially parallel manner are intended to be encompassed by the teachings of the present invention. Surfaces 1001 and 1002 are, illustratively, nanostructured surfaces having a plurality of nanostructures similar to the nanostructured surfaces discussed above. One skilled in the art will recognize that surface 1001 may or may not be nanostructured depending upon the implementation of the principles disclosed herein. Each of surfaces 1001 and 1002 have openings 1003 and 1004, respectively, for allowing a fluid, such as air flow 1005 moving in direction 1006, to enter into the space between the two surfaces 1001 and 1002 and to exit from that space through opening area 1004 as air flow 1009. Opening areas 1003 and 1004 may be, illustratively, filtered openings so that only particles below a certain size are permitted to enter the space between the two surfaces 1001 and 1002.

Area 1014 of surface 1002 is, illustratively, a pixilated area wherein some or all of the pixels are capable of holding a pixel reagent. The pixel reagents are selected such that, when a pixel reagent comes into contact with a particular substance or element, a desired reaction occurs. One skilled in the art will recognize that such an arrangement is useful, for example, in causing a reaction between a pixel reagent and a biological substance. By monitoring the pixels, either visibly for example or via other well known means, the presence of a particular biological or chemical substance can be detected by noting the reaction with the appropriate pixilated reagent.

Figure 11:
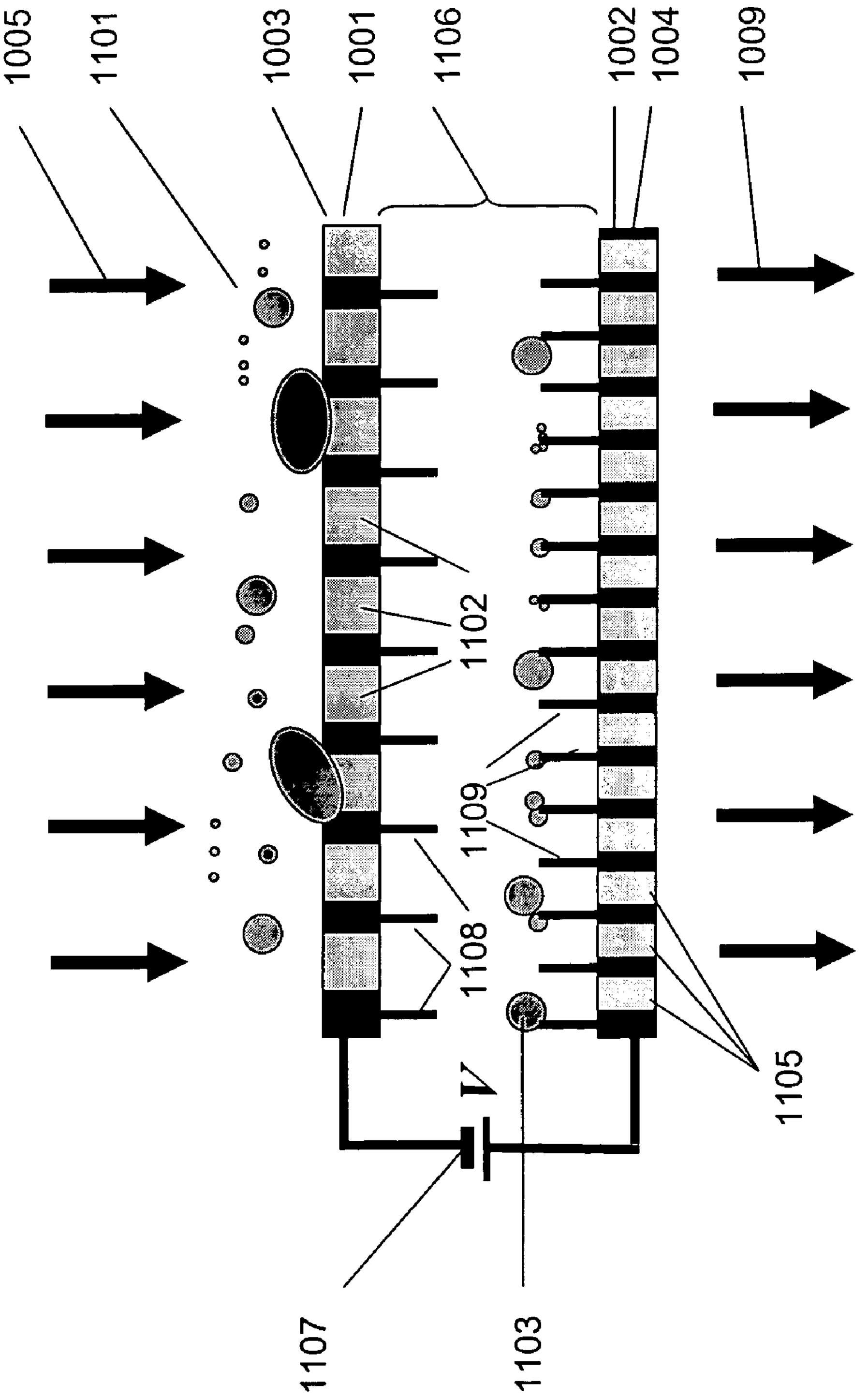
FIG. 11 shows one illustrative embodiment of how biological/chemical particles are collected in the detector of FIG. 10.

FIG. 11 shows one illustrative embodiment of how air may enter the volume between surfaces 1001 and 1002 in detector 1000 of FIG. 10 and introduce aerosol particles for collection and sampling by the detector. Specifically, FIG. 11 shows a cross section view of opening areas 1003 and 1004 in FIG. 10. Opening area 1003 has, illustratively, holes 1102 through nanostructured surface 1001 through which air flow 1005 may enter the space 1106 between the surfaces 1001 and 1002. As air flow reaches area 1003, illustrative particles 1101 carried by the airflow 1005 also reach area 1003. However, in one illustrative embodiment, the holes in area 1003 are sized such that larger particles are unable to pass through the holes. As a result, only relatively small particles, such as those particles similar in size to those that detector 1000 in FIG. 10 is designed to detect, are allowed to pass through area 1003 and enter space 1106. A voltage is illustratively applied to the nanostructures 1108 on area 1003 and the nanostructures 1109 on area 1004 via voltage source 1107 in order to create an electric field between nanostructures 1108 and 1109. Nanostructures 1108 are separated from nanostructures 1009 by, for example, 1 to 500 micrometers. One skilled in the art will recognize in light of the teaching herein that a number of appropriate separation distances can be chosen. As the smaller particles enter the space 1106, those particles move along the electric field between nanostructures 1108 and 1109 and become attached via electrostatic attraction to the ends of nanostructures 1109, represented in FIG. 11 as particles 1103. The air flow continues through space 1106 and exits that space as airflow 1009 through holes 1105 in area 1004 on surface 1002.

Referring once again to FIG. 10, and as described above, once airflow 1005 enters the space between surfaces 1001 and 1002, relatively small particles are collected on the ends of the nanostructures in area 1004, while the area 1003 illustratively functions to filter out larger particles. Detector 1000 has, for example, a plurality of reagents 1007*a*, 1007*b*, 1007*c*, and 1007*d* disposed in area 1008. Once particles have been collected on the nanostructures in area 1004, as described above, one or more of the reagents are caused to pass across the nanostructures in area 1004 using methods such as those discussed below. As a reagent, such as reagent droplet 1007*a* moves across area 1004, the electrostatic attraction force holding the particles collected on the tips of the nanoposts is overcome by the surface tension force experienced by the particles as they are wetted by the droplet and those particles are absorbed by the reagent droplet 1007*a*.

Figure 12:
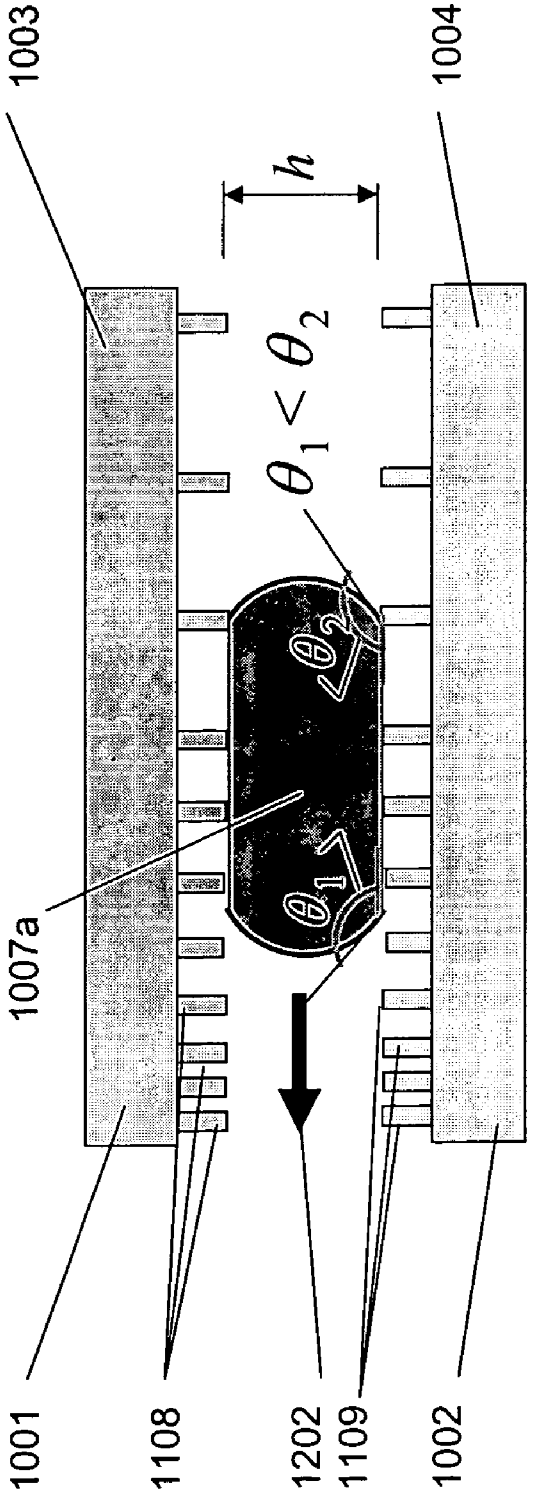
FIG. 12 shows an illustrative embodiment of how a liquid droplet may be caused to move across the surfaces of the biological/chemical detector of FIG. 10 by using an areal gradient of nanostructures.

FIG. 12 shows one such method of moving the reagent across the area 1004 between surfaces 1001 and 1002. Specifically, in this illustrative example, nanostructures on parallel surfaces, such as surfaces 1001 and 1002 are separated by a distance h of approximately 200 micrometers. Droplet 1007*a* which, as shown in FIG. 10 is a droplet of reagent, is approximately 100 nanoliters in volume. As discussed herein above in association with FIG. 8, the density of the nanoposts on area 1003 and 1004 in FIG. 10 can illustratively be varied in a way such that, once released from area 1008 in FIG. 10, reagent droplet 1007*a* moves in direction 1202 across the nanostructured surfaces 1001 and 1002. As discussed previously, when the density of nanostructures 1108 and 1109 increases, as illustratively shown in FIG. 12, the leading edge contact angle $\theta_1$ decreases relative to the contact angle $\theta_2$, thus leading to a force imbalance between the leading and trailing edges of the droplet. Accordingly, droplet 1007*a* moves in predetermined direction 1202. Using the exemplary dimensions described above, it is illustratively possible to move droplet 1007*a* approximately 50 mm when surfaces 1001 and 1002 are disposed horizontally or approximately 10 mm when surfaces 1001 and 1002 are arranged vertically.

Figure 13:
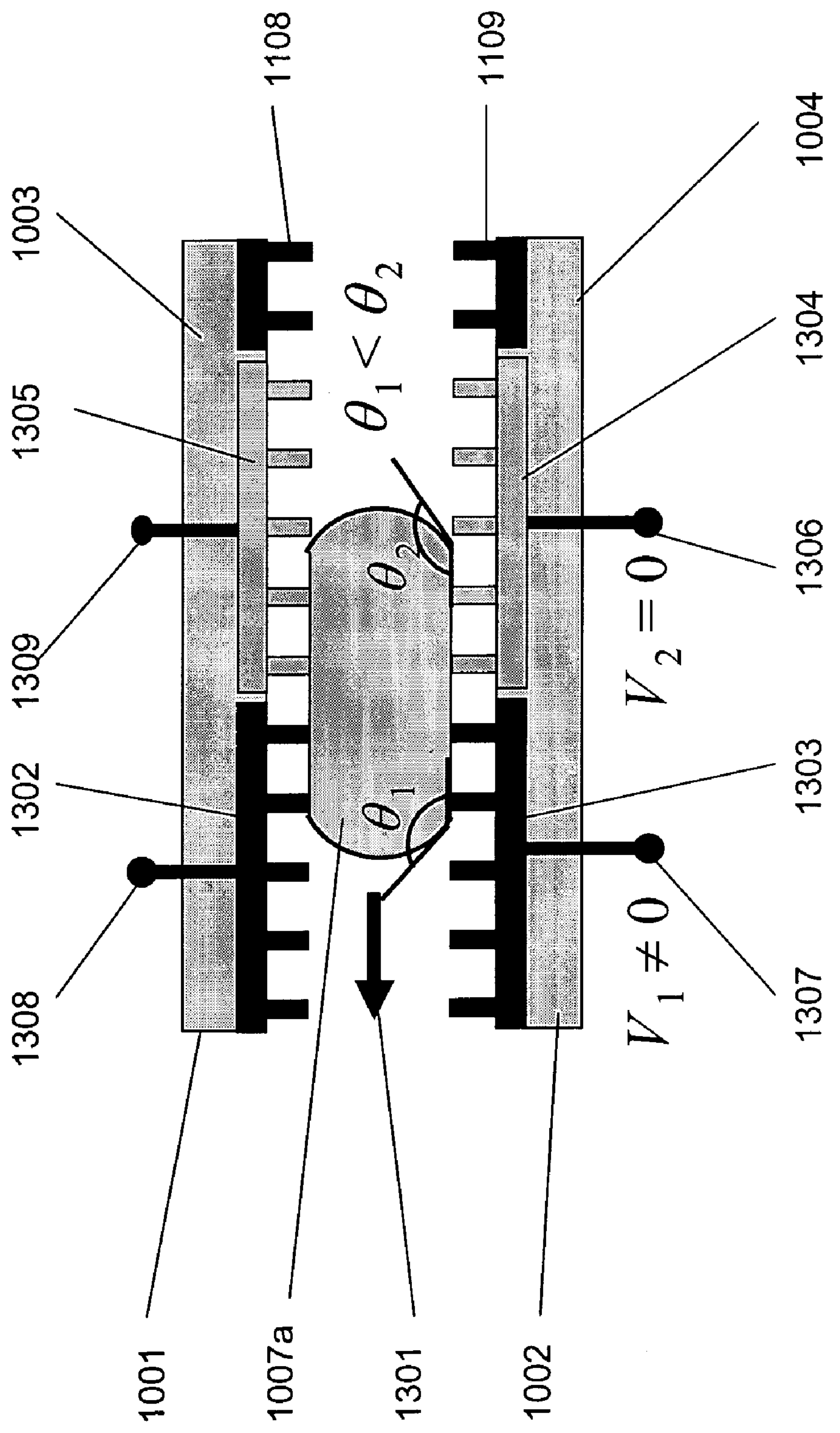
FIG. 13 shows another illustrative embodiment of how a liquid droplet may be caused to move across the surfaces of the biological/chemical detector of FIG. 10 by sequentially applying a voltage across electrodes in the path of the droplet.

FIG. 13 shows another illustrative embodiment in accordance with the principles of the present invention whereby a droplet, such as a droplet 1007*a* of reagent, is caused to move across a surface, such as area 1004 of surface 1002. Specifically, FIG. 13 shows illustrative surfaces 1001 and 1002 having a plurality of nanostructured electrodes 1302–1305 disposed thereon. Illustratively, in this embodiment, droplet 1107*a* once again is a 100 nanoliter droplet of, for example, reagent and the nanostructures 1108 and 1109 are separated by a distance of approximately 200 micrometers. The nanostructures 1108 and 1109 are separated from adjacent nanostructures on the same surface by approximately 1.25 micrometers. Similar to the case discussed in association with FIG. 9 herein above, by applying a voltage via leads 1307 and 1308 to nanostructured electrodes 1303 and 1302, respectively, the contact angle $\theta_1$ decreases relative to the contact angle $\theta_2$ which corresponds to that portion of the droplet disposed on electrodes 1305 and 1304. As a result the droplet 1007*a* moves, for example, in direction 1301.

One skilled in the art will recognize that a continuous movement of droplet 1007*a* may be achieved by sequentially applying and removing the voltages applied to the electrodes, such as electrodes 1302–1305 along the desired line of travel of droplet 1007*a*. Thus, for example, relatively complex and non-predetermined paths of motion of the droplet 1007*a* can be achieved across surface 1002 of detector 1000 in FIG. 10 by activating sequentially the electrodes along the path of travel of droplet 1007*a*. For example, referring once again to FIG. 10, droplet 1007*a* can be made to move using this sequential voltage method in direction 1018 across area 1004, thus collecting aerosol particles collected on the tips of the nanostructures in area 1004. Then, by sequentially activating electrodes along the path of the droplet 1007*a* containing those collected particles, the droplet can be made to move across area 1014 of surface 1001 in direction 1010. Next, in order to reach, for example, desired reagent pixel 1015, the electrodes along path 1012 and 1016 are sequentially activated, thus causing the droplet to follow path 1012 and path 1016 until the droplet reaches pixel destination 1015. Since the droplet is moving over the nanostructures along surface 1002, neither the droplet nor the aerosol particles absorbed by the droplet come into contact with any reagents along the path of the droplet such as, for example, that reagent in pixel 1017. Thus, unlike prior microfluidic biological and chemical detectors, no microchannels are required to move the droplet of liquid to a desired reagent pixel—the movement may be achieved on a planar surface of nanostructures according to the principles described above.

One skilled in the art will recognize that, in light of the teaching in association with FIGS. 4A and 4B, applying a certain level of voltage to the nanostructured electrodes 1302–1305 could result in the droplet 1007*a* penetrating the nanostructured surface and thus possibly contacting the reagent in pixel 1017. However, in order to prevent such a penetration, the voltage applied to the electrodes to achieve motion of the droplet in direction 1301 is selected from the range of voltages below the voltage threshold necessary to overcome the surface tension of the droplet that would cause such penetration. For example, using the dimensions for the droplet and the nanostructured surfaces of FIG. 13, a voltage of approximately 18 volts would be sufficient to initiate motion of the droplet without causing droplet penetration. One skilled in the art will fully recognize that a range of voltages could be used to achieve this movement without causing penetration, depending upon the dimensions of the nanostructured surfaces and the dimensions and substance used for the droplet.

Figure 14A:
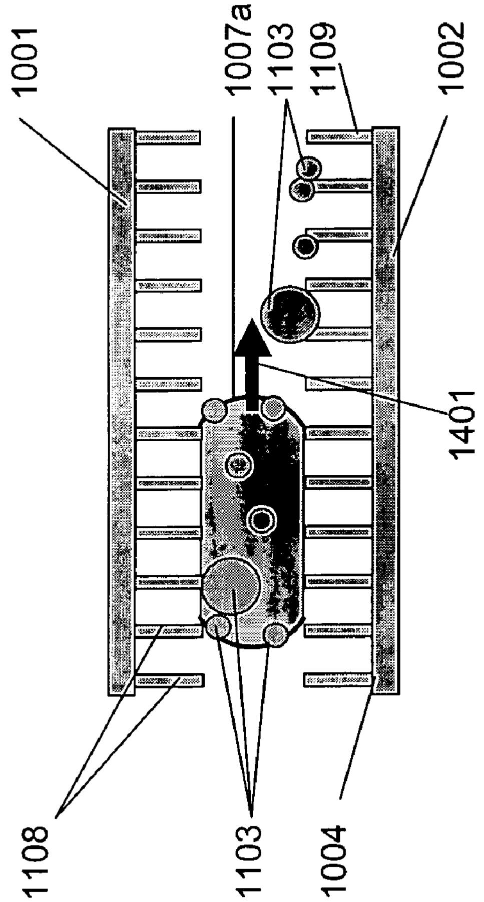
FIGS. 14A and 14B show how a droplet of reagent in the detector of FIG. 10 can be used to collect particles and transport them to a pixel reagent.
Figure 14B:
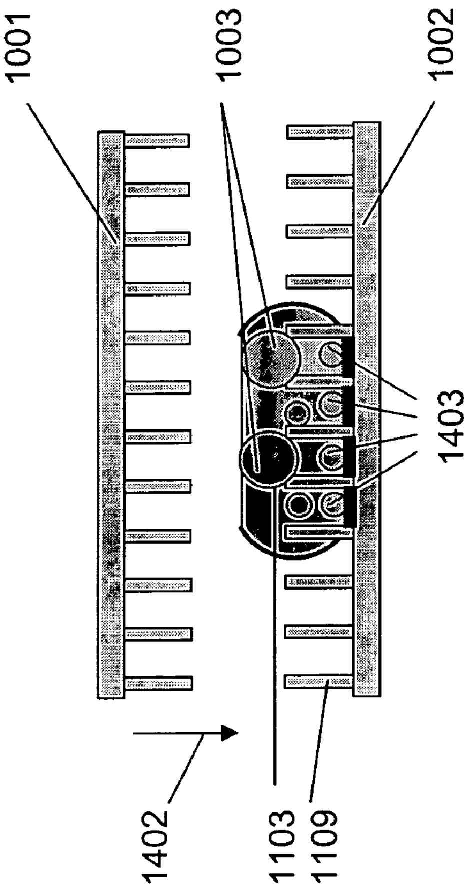

FIGS. 14A and 14B show how, as discussed above, a droplet moving along area 1004 of surface 1002 will absorb aerosol particles adhering to the tips of nanostructures 1109. In particular, whether the droplet moves via one of the previously-described methods or any other method of motion, as the droplet 1007*a* moves across the nanostructures 1108 and 1109 of surfaces 1001 and 1002, respectively, the particles adhering to the tips of the nanostructures 1109 in area 1004 become absorbed by the droplet 1007*a*. Accordingly, as the droplet moves in direction 1401 along the nanostructures, it will carry those absorbed particles 1103. Once the droplet has been transported to a particular location, such as pixel 1015 in FIG. 10, the droplet may be caused to penetrate the nanostructures using the previously discussed electrowetting penetration, for example, by applying a voltage to the droplet or nanostructures in a way such that the contact angle of the droplet relative to the nanostructures is decreased, thus overcoming the surface tension of the droplet and causing it to penetrate the surface. As shown in FIG. 14, the spacing of nanostructures 1109 may be selected such that, when the droplet penetrates those nanostructures, only the smaller particles within the droplet are permitted to come into contact with surface 1002 where, for example, a reagent 1403 is disposed. Reagent 1403, for example, a reagent selected to detect the presence of a particular substance or species. If the smaller particles 1103 are or contain this substance or species, then the reaction with reagent 1403 will provide an indication that this substance or species has been detected.

Figure 15:
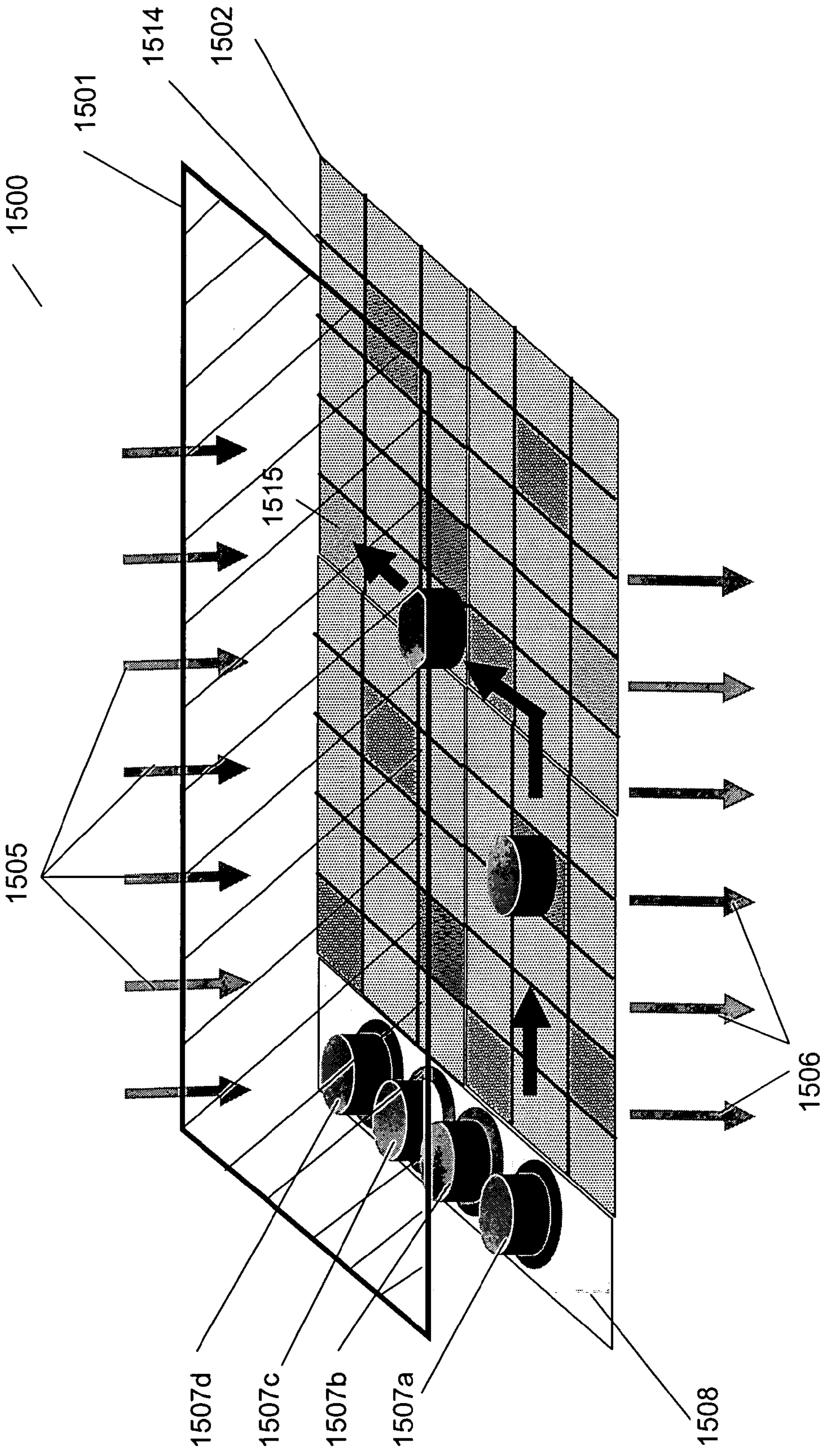
FIG. 15 shows another embodiment of a biological/chemical detector in accordance with the principles of the present invention.

FIG. 15 shows another illustrative embodiment of a chemical and biological detector 1500 in accordance with the principles of the present invention. Specifically, detector 1500 has surfaces 1501 and 1502 which are, as in the detector 1000 of FIG. 10, substantially parallel nanostructured surfaces. Also as with detector 1000 of FIG. 10, detector 1500 has illustrative pixilated area 1514 as well as illustrative area 1508 where reagents, such as reagents 1507*a*, 1507*b*, 1507*c* and 1507*d* are disposed. However, unlike the detector of FIG. 10, detector 1500 does not have specific areas, such as areas 1003 and 1004 of FIG. 10, through which air flow is directed to facilitate collection of aerosol particles. Instead, the detector 1500 is designed such that the entirety of surfaces 1501 and 1502 are open to airflow. As such, air can flow in direction 1505 through surface 1501, thus entering the space between the two surfaces 1501 and 1502 and exiting in direction 1506. Similar to the embodiment shown in FIG. 11, the holes in surface 1501 may be designed in a way such that larger particles in the air flow are prevented from entering the space between surfaces 1501 and 1502 and only relatively smaller particles are permitted to enter that space and to come into contact with the entirety of surface 1502.

Figure 16:
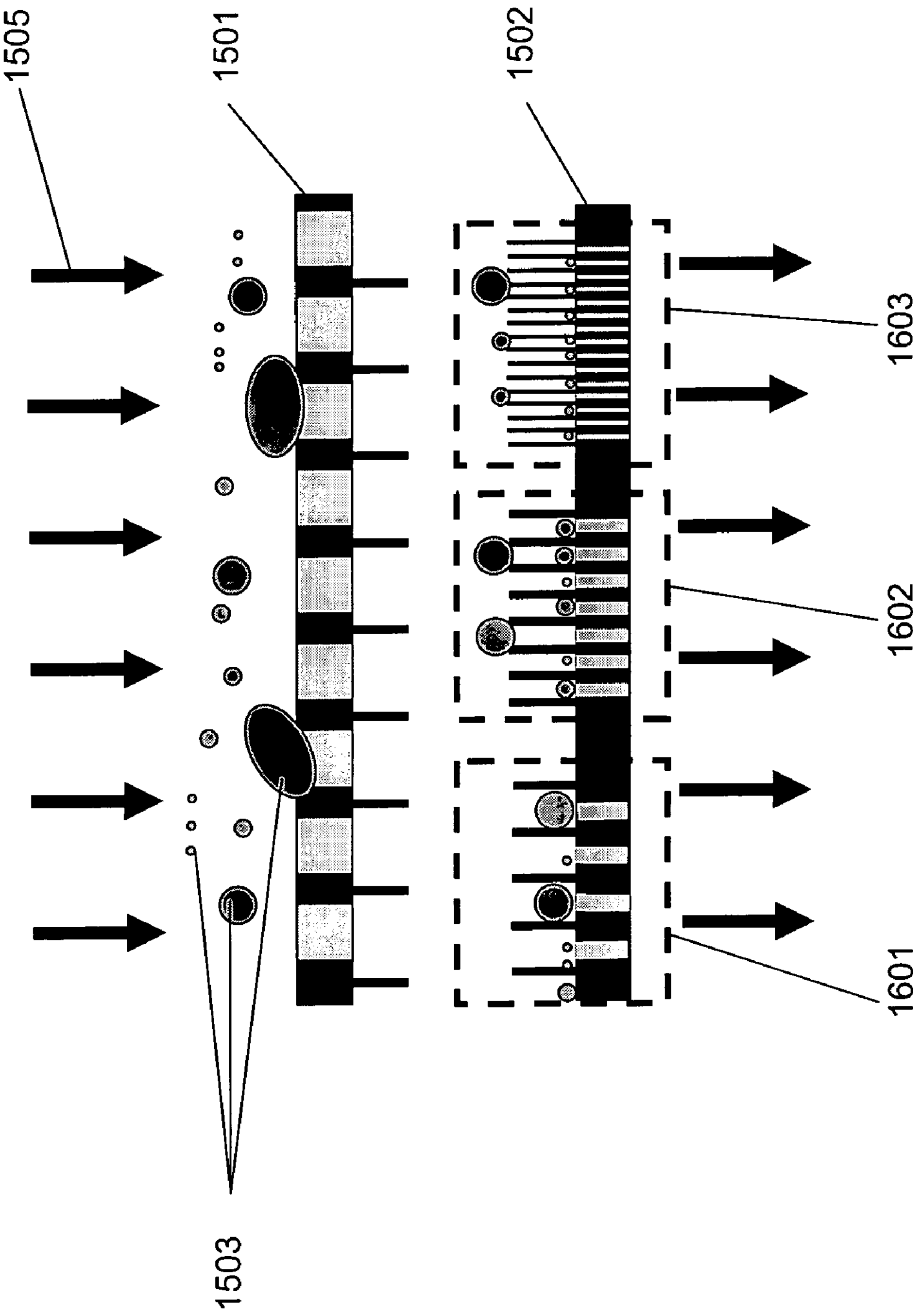
FIG. 16 shows another illustrative embodiment of how biological/chemical particles are collected in the detector of FIG. 15.
Figure 17:
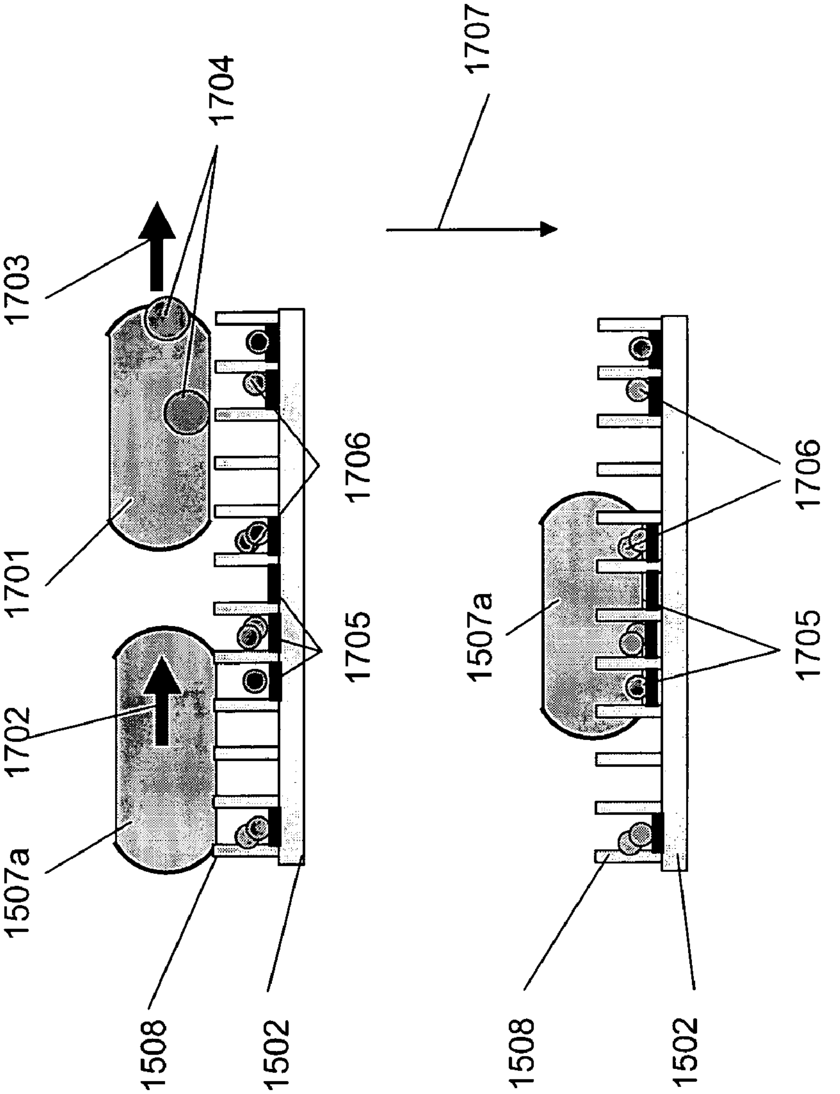
FIG. 17 shows how a cleaning droplet and a reagent droplet can be used to cause a reaction between a pixel reagent and a biological or chemical particle.

FIGS. 16 and 17 show one illustrative embodiment in accordance with the principles of the present invention of how detector 1500 could operate to desirably detect aerosol particles that enter the space between surfaces 1501 and 1502. Specifically, as already discussed, when particles 1503 carried in airflow 1505 contact the outer side of surface 1501, the larger particles are prevented from passing through the surface. Thus, only the relatively smaller particles are permitted to enter the space between the two surfaces. Unlike the embodiment of FIG. 11, instead of applying a voltage to the nanostructures on the surfaces and causing the particles to adhere to the tips of the nanostructures, particles 1503 are allowed to drop between the nanostructures of surface 1502. However, the nanostructures of surface 1502 may be disposed such that, upon contacting surface 1502, only specifically-sized particles will be allowed to penetrate the nanostructures of specific areas of surface 1502. For example, the nanostructures of area 1601 are spaced widely enough that medium-sized particles are permitted to penetrate between the nanostructures. However, as illustrated by the nanostructures in areas 1602 and 1603, the nanostructures can be more closely spaced together to allow only smaller particles to contact the surface between the nanostructures.

FIG. 17 shows one illustrative embodiment of how a reaction can be induced with a reagent in a pixel on a detector such as pixel 1515 in detector 1500. Specifically, FIG. 17 represents area 1602 in FIG. 16 whereby larger particles 1704 are prevented from falling between nanostructures 1508. Thus, only relatively smaller particles 1706 are permitted to contact reagent 1705. In one illustrative embodiment, cleaning droplet 1701 is first caused to move over the nanostructures 1508 in direction 1703 in order to remove the larger particles 1704 from above the nanostructures. Then, reagent droplet 1507*a* is caused to move over the nanostructures in direction 1702 until it is above the pixel having pixel reagent 1705 in contact with relatively smaller particles 1706. Then, as described above, the droplet is caused to penetrate the nanostructures in direction 1707 by, for example, reducing or overcoming the surface tension of the liquid droplet via electrowetting or other well known methods. Once the transport reagent comes into contact with particles 1706 and pixel reagent 1705, a reaction occurs if the particles correspond to the particular or contain a reactive species or compound for the particular reagents used. Thus, the presence or absence of a particular particle or species within the particle can be detected.

Figure 18A:
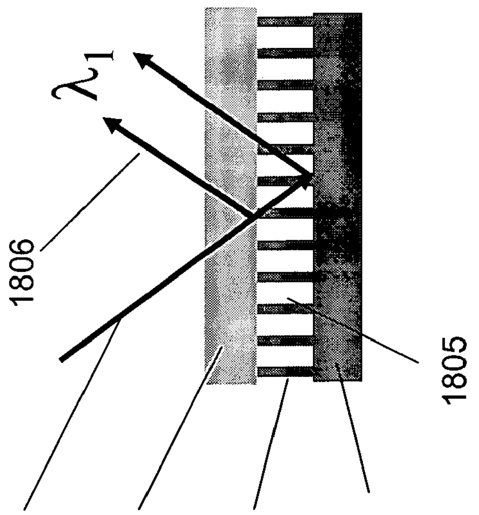
FIG. 18 shows one embodiment of how the results of reactions in the detectors of FIGS. 10 and 15 may be displayed in accordance with the principles of the present invention.
Figure 18B:
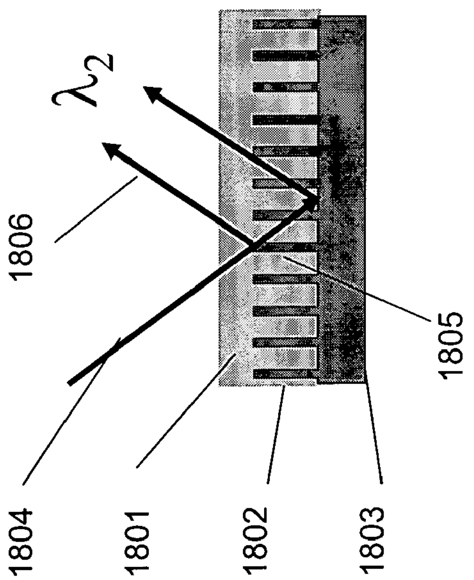

FIGS. 18A and 18B show one possible method of identifying when a particular substance has been detected in the detectors of FIGS. 10 and 15. Specifically, in FIG. 18A, an optical diffractive grating is shown wherein a droplet 1801 of liquid which is transparent to at least some wavelengths of light is disposed on nanostructures 1802. Nanostructures 1802 are, in turn, disposed on surface 1803 which is, for example, a nanostructured surface, as previously described. When light beam 1804 is incident upon droplet 1801, at least some wavelengths pass through droplet 1801 and are reflected off of surface 1803 in such a way that the light travels along path 1806 back through the droplet of liquid. By passing through the liquid droplet 1801, then through area 1805 (having dielectric constant $e_1$), and reflecting off of the underlying substrate 1803, various frequencies of light are filtered out (due to the difference in refractive index between the liquid and area 1805) and only wavelength $\lambda_1$ emerges to propagate in the predetermined direction. FIG. 18B demonstrates that, by causing the liquid droplet 1801 containing, for example, aerosol particles, to penetrate the nanostructures 1802 (through the use of one of the aforementioned methods described above), the dielectric constant of area 1805 changes to $e_2$, thus changing the refractive index of the medium through which the light travels and, therefore, only $\lambda_2$ will emerge to propagate in the predetermined direction. Thus, one skilled in the art will recognize that a tunable diffractive grating is created that, when the liquid 1801 penetrates the nanostructure feature pattern, allows a different wavelength of light to pass through the grating, compared to when the liquid 1801 is not penetrated into the feature pattern. One skilled in the art will also recognize that, by properly selecting the reagents for use in the pixels of surface 1002, the wavelength of light allowed to pass through the grating can be tuned depending on whether or not a particular biological or chemical particle has reacted with the reagent. Accordingly, each individual pixel in detectors 1000 in FIG. 10 and 1500 in FIG. 15 may be made to change visible color or, alternatively, for example, a pixel may appear differently when an ultraviolet or infrared light source is applied. One skilled in the art will be able to devise other suitable means for detecting whether or not a reaction has taken place and, thus, whether a particular particle or species within the particle has been detected by detectors 1000 and 1500.

Thus, the principles of the invention as described herein provide a dynamically controllable biological/chemical detector that is capable of manipulating liquids across nanostructured surfaces without relying on microchannels in the surfaces. Accordingly, a chemical reaction between the droplet and reagents on the surface may be induced at any time and any droplet position. Detectors according to the principles of the present invention are efficient in usage of space and consume very low power.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. One skilled in the art will be able to devise many similar uses of the underlying principles associated with the present invention, all of which are intended to be encompassed herein. For example, while two methods of collecting, for example, airborne particles are shown herein in FIGS. 11 and 16 and the accompanying description, one skilled in the art will be able to devise in light of the teachings herein numerous methods of concentrating and collecting such particles. Additionally, while the illustrative embodiments disclosed herein generally discuss airflows carrying particles into and through the detectors of FIGS. 10 and 15, one skilled in the art will recognize that the detectors may be used equally advantageously with any fluid carrying particles, such as a flow of liquid carrying biological species or chemical compounds. Also, the above-discussed embodiments all teach transporting a droplet of liquid to a pixel in an array of nanostructured pixels and then bring that liquid into contact with a reagent in that pixel. However, one skilled in the art will recognize that the droplet of liquid could comprise a reagent and, therefore, no reagent at between the nanostructures would be necessary. For example, the droplet could be caused to react with particular chemical compounds or biological species by applying a voltage to initiate the reaction. In such a case, no additional reagent between the nanostructures would be required. All such variations and methods are intended to be encompassed herein. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A detector comprising:

a surface having a plurality of nanostructured projections disposed thereon, the projections having tips;

a reagent pixel on the surface, between the plurality of projections; means for moving a liquid across tips of the nanostructured projections without contacting the reagent pixel; and means for moving the liquid toward said surface in a way such that the liquid contacts said reagent pixel.

2. The detector of claim 1 wherein a density of the nanostructured projections is varied in a way such that said liquid moves across the tips of the nanostructured projections toward an area having a highest density of tips of said nanostructured projections.

3. The detector of claim 1 wherein said means for moving a liquid across the nanostructured projections includes a plurality of electrodes disposed on said surface in a way such that, upon sequentially applying a voltage to an electrode in said plurality of electrodes, the liquid moves in a desired direction.

4. The detector of claim 1 wherein said liquid includes a reagent.

5. The detector of claim 1 wherein said liquid is adapted to absorb particles disposed on the tips of said plurality of projections.

6. The detector of claim 5 wherein said liquid is further adapted to transport said particles to the reagent pixel.

7. The detector of claim 1 in which the means for moving a liquid toward the surface includes a plurality of electrodes disposed on the surface in a way such that, upon applying a voltage to an electrode at a position on the surface, a liquid moves toward the position on the surface.

8. The detector of claim 1 in which the means for moving a liquid toward the surface includes a heat source for heating the liquid to reduce surface tension of the liquid.

9. The detector of claim 1 in which the means for moving a liquid toward the surface includes a source of acoustic energy.

10. The detector of claim 1 in which the means for moving a liquid toward the surface includes a source of electromagnetic energy.

11. The detector of claim 1 in which the means for moving a liquid toward the surface includes inducing a chemical change at tips of projections.

12. The detector of claim 1 in which the liquid is in the form of at least one droplet.

13. The detector of claim 1, in which tips include microposts.

14. The detector of claim 1, in which tips include nanoposts.

15. The detector of claim 1, in which tips include a microline.

16. The detector of claim 1, in which the reagent pixel is reactive with a chemical compound.

17. The detector of claim 1, in which the reagent pixel is reactive with a biological agent.

18. The detector of claim 1, in which the reagent pixel is reactive with a ribonucleic acid.

19. The detector of claim 1, in which the reagent pixel is reactive with an antibody.

20. The detector of claim 1, in which the reagent pixel is reactive with an antigen.

* * * * *